United States Patent

Hori (12)

(10) Patent No.: US 6,239,835 B1
(45) Date of Patent: *May 29, 2001

(54) IMAGE INPUT APPARATUS CAPABLE OF CONTROLLING AN IMAGING DEVICE BASED ON INFORMATION PICKED UP BY THE DEVICE

(75) Inventor: Shinjiro Hori, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/553,755

(22) Filed: Oct. 23, 1995

(30) Foreign Application Priority Data

Oct. 26, 1994 (JP) .................................................. 6-262739

(51) Int. Cl.[7] ...................................................... H04N 5/232

(52) U.S. Cl. ............................................. 348/211; 348/358

(58) Field of Search ..................................... 348/207, 211, 348/231, 358, 333, 373, 374, 375, 143, 169, 370, 155, 345, 349, 350; 345/173, 179, 180, 182, 183; H04N 5/225

(56) References Cited

U.S. PATENT DOCUMENTS

| 4,064,528 | * | 12/1977 | Bowerman | 348/169 |
| 5,227,622 | * | 7/1993 | Suzuki | 250/221 |
| 5,373,319 | * | 12/1994 | Lee | 348/169 |
| 5,416,513 | * | 5/1995 | Mirisaki | 348/169 |
| 5,432,597 | * | 7/1995 | Parker et al. | 348/169 |
| 5,546,125 | * | 8/1996 | Tomikata | 348/169 |
| 5,559,551 | * | 9/1996 | Sakamoto et al. | 348/169 |
| 5,589,878 | * | 12/1996 | Cortjens | 348/211 |

FOREIGN PATENT DOCUMENTS 63-276371 * 11/1988 (JP) .............................. H04N/5/232

* cited by examiner

*Primary Examiner*—Tuan Ho
(74) *Attorney, Agent, or Firm*—Fitzpatrick, Cella, Harper & Scinto (57) ABSTRACT

An image input apparatus includes a camera, a control device for controlling the camera, and a determination device for determining an instruction for the camera based on an image output from the camera and for outputting the instruction corresponding to a result of the determination to the control device. Preferably, the user utilizes an indication device being photographed by the camera, and the determination device determines which portion of the document is being indicated by the user and controls the camera to magnify the area being indicated by the user. The user can thus control the camera in a hand-free operation.

34 Claims, 4 Drawing Sheets

IMAGE INPUT APPARATUS CAPABLE OF CONTROLLING AN IMAGING DEVICE BASED ON INFORMATION PICKED UP BY THE DEVICE

BACKGROUND OF THE INVENTION

1. Field of the Invention

This invention relates to an image input apparatus, and, more particularly, to an image input apparatus for imaging (e.g. photographing) a document or a picture and which can change its imaging range.

2. Description of the Related Art

Recently, in accordance with the diffusion of image compression/encoding techniques and digital communication networks, recommendations for service provisions, protocol provisions, multimedia multiplexing frame configuration provisions and the like for AV (audio-visual) services, such as TV (or video) conference systems and video telephones, have been established, and various kinds of communication terminals have also been proposed. In particular, camera apparatuses for inputting images of various kinds of objects have attracted notice as a subsystem of a video conference system.

Figure 5:
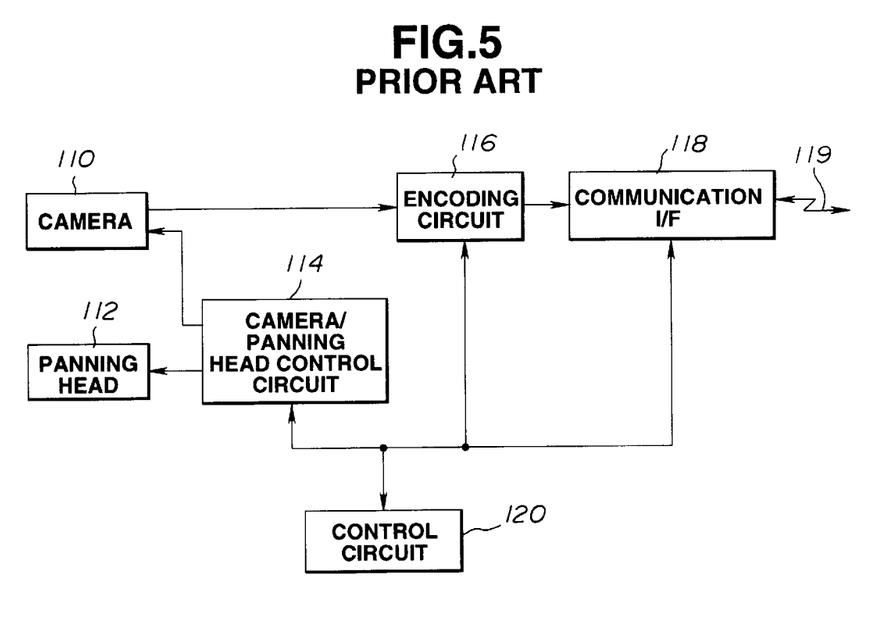
FIG. 5 is a schematic block diagram illustrating the configuration of a conventional camera apparatus.

FIG. 5 is a schematic block diagram illustrating the configuration of a conventional camera apparatus. In FIG. 5, a camera 110 is mounted on a panning head 112 capable of performing panning and tilting. A camera/panning head control circuit 114 controls photographing conditions, such as zooming, focusing, exposure and the like, of the camera 110, as well as the rotation of the panning head 112 within the horizontal plane and the vertical plane (i.e., the panning and tilting of the camera 110).

A signal representing an image photographed by the camera 110 is subjected to compression/encoding by an encoding circuit 116, and the obtained signal is transmitted to a communication partner terminal (not shown) via a communication interface (I/F) 118 and a communication network 119.

A control circuit 120 controls the camera/panning head control circuit 114 and the encoding circuit 116 in accordance with user instructions input at the user's own terminal and control commands received from the communication partner terminal. For example, the user of the terminal where the illustrated camera apparatus is installed inputs user instructions (such as zooming, panning, tilting and the like) using a pointing device attached to the terminal (such as a mouse, a keyboard or the like) while displaying the image photographed by the camera apparatus on a monitoring picture surface (e.g. CRT monitor). The control circuit 120 supplies the camera/panning head control circuit 114 with control commands corresponding to the input user instructions. The camera/panning head control circuit 114 controls the camera 110 and the panning head 112 so as to provide a user-terminal instructed state.

Camera/panning head control commands from the communication partner terminal are transferred to the camera/panning head control circuit 114 via the network 119 and the communication interface 118, and the camera/panning head control circuit 114 controls the camera 110 and the panning head 112 so as to provide a communication partner-terminal instructed state (which is instructed by the operator of the communication partner terminal). Camera/panning head control commands from the communication partner terminal are, in some cases, transferred to the camera/panning head control circuit 114 via the communication interface 118 and the control circuit 120. In such a case, functional blocks may be more or less differently recognized.

For such a camera apparatus, it would be advantageous to assign a target region within an object or a photographing field of view, and to photograph the assigned region while magnifying it. Particularly, when giving an explanation to the communication partner while photographing an object with the camera apparatus of the user's own terminal, the target region is frequently changed during the explanation. Accordingly, it is important to provide the camera apparatus with such an operational environment that the target region can be easily and smoothly assigned and changed.

Conventionally, when controlling zooming, panning, tilting and the like of the camera apparatus at the transmission side, the zooming ratio is changed and the panning and tilting angles are set while watching an image displayed on the monitoring picture surface of the user's own terminal. In general, the user explains an object to the communication partner while indicating the region of the object about which the user explains. Thus, the user must sequentially indicate the region of the object being explained and then control the camera to properly image that region. This indicates that the user must frequently move his eyes between the object mounted adjacent the camera apparatus and the monitoring picture surface, thereby causing very troublesome operations.

SUMMARY OF THE INVENTION

It is an object of the present invention to provide an image input apparatus which solves the above-described problems and which can change the imaging state in various ways while greatly improving the operability of the apparatus.

According to one aspect, the present invention, which achieves the above-described object, relates to an image input apparatus comprising a camera unit, control means for controlling the camera unit, and determination means for determining an instruction for the camera unit based on an image output from the camera unit and for outputting the instruction corresponding to a result of the determination to the control means.

According to another aspect, the present invention relates to an image input apparatus comprising a camera unit, a panning head capable of changing an imaging orientation of the camera unit, control means for controlling at least one of the camera unit and the panning head, and determination means for determining an instruction for at least one of the camera unit and the panning head based on an image output from the camera unit and for outputting the instruction corresponding to a result of the determination to the control means.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described in detail with reference to the drawings.

Figure 1:
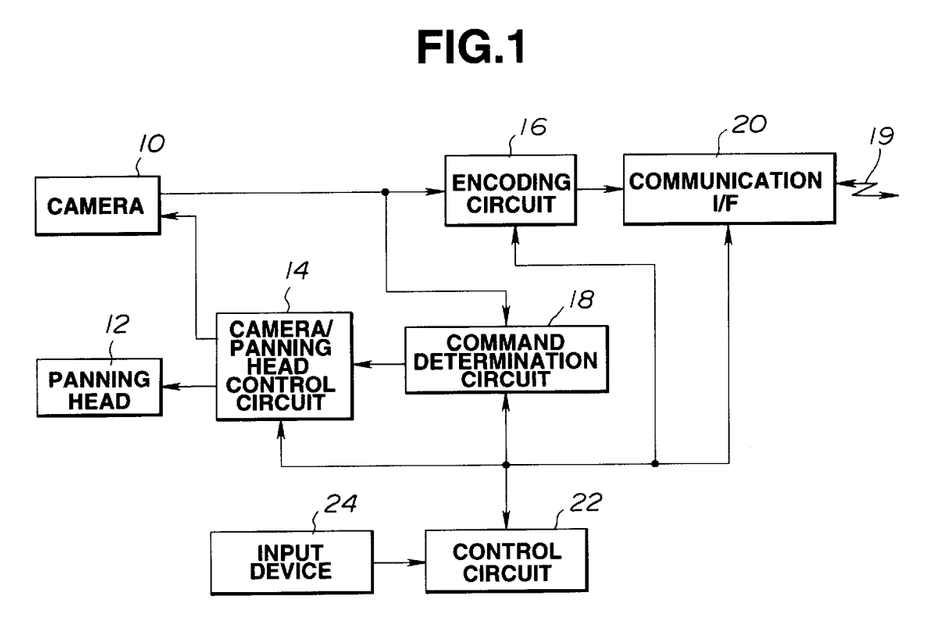
FIG. 1 is a schematic block diagram illustrating the configuration of a camera apparatus according to an embodiment of the present invention.

FIG. 1 is a schematic block diagram illustrating the configuration of a camera apparatus according to the preferred embodiment. In FIG. 1, a camera 10 is mounted on a panning head 12 capable of performing panning and tilting. A camera/panning head control circuit 14 controls photographing conditions, such as zooming, focusing, exposure and the like, of the camera 10, as well as the rotation of the panning head 12 within the horizontal plane and the vertical plane (i.e., the panning and tilting of the camera 10). An existing CCD (charge-coupled device) camera module can be used in the camera 10.

A video output signal from the CCD camera 10 is a digital signal suitable for computer processing. If components of the signal comprise R, G and B signals representing three primary colors, red, green and blue, respectively, or Y, U and V signals representing luminance and color difference signals, then, as shown in FIG. 1, the output signal can be directly supplied to an encoding circuit 16 and a command determination circuit 18 for subsequent processing.

In general, however, an output signal from a CCD camera module is an analog composite signal conforming to an international standard which is called an NTSC signal or a PAL signal. Since such a signal format cannot be subjected to image processing by a computer in its original form, a preprocessing unit (not shown) for converting the output from the CCD camera module into an RGB or YUV format (which can be processed by the computer) is provided at a stage after the camera unit 10. Preprocessing includes analog-to-digital conversion, decoding, color-space conversion and the like.

A signal representing an image photographed by the camera 10 is supplied to the encoding circuit 16 and to the command determination circuit 18. The command determination circuit 18 determines an instruction for the camera 10 and the panning head 12 based on image information photographed by the camera 10 (e.g. movement of a pointing means in the camera field of view). The command determination circuit 18 compares the photographed information with predetermined instructions (based on predetermined photographed information) stored in circuit 18, and supplies a camera/panning head control circuit 14 with a control command based on the comparison. The camera/panning head control circuit 14 controls zooming and the like of the camera 10 and the panning and tilting angles of the panning head 12 in accordance with the control command from the command determination circuit 18.

The photographed image information used to obtain the control command may comprise an object movement pattern and a pattern of a change in luminance which are characteristic patterns detectable within the photographed image information. In one method, information relating to control commands corresponding to these patterns is stored in a memory within the command determination circuit 18 as described above, and a control command is supplied to the camera/panning head control circuit 14. In another method, information relating to control commands corresponding to these patterns is stored in a memory within a control circuit 22, and pattern information is supplied from the command determination circuit 18 to the control circuit 22, which controls the camera/panning head control circuit 14 in accordance with the corresponding patterns. Any of these two methods may be adopted.

If the apparatus is arranged such that the user can freely change the correspondence between the received patterns and the control commands, the apparatus is more efficiently utilized.

An operation which is considered to be most frequently used in the present invention is to change the size of the photographing region, and more specifically, to magnify an arbitrary region within the photographing field of view and to return the photographing field of view to the entire document or to a state before magnification. This requires control of zooming and focusing of the camera 10. Another frequently used operation is to move the photographing region, i.e., to move the photographing field of view in an arbitrary direction. In such a case, the panning head 12 must be controlled. Although not so frequently used, there are, for example, operations to terminate the photographing operation, and to stop the picture surface. In the present invention, however, since a command is determined based on photographed image information, it is difficult to input and recognize command information when repeating magnifying operations. Accordingly, it is preferred to also provide the capability of inputting a control command using an input device 24, comprising a keyboard, a mouse and the like, shown in FIG. 1.

The encoding circuit 16 compresses and encodes image information output from the camera 10. A method for performing compression/encoding is, for example, provided in ITU-T (International Telecommunication Union-Telecommunications Standardization Sector) (the former CCITT (Comité Consulatif International Télégraphique et Téléphonique) recommendation H. 261, although the present invention is not limited to this method. Compressed data from the encoding circuit 16 is transmitted to the communication partner terminal (not shown) via a communication interface 20 and a communication network 19.

The control circuit 22 controls the camera/panning head control circuit 14, the encoding circuit 16 and the command determination circuit 18 in response to an instruction input to the user's own terminal and/or a control command received from the communication partner terminal. For example, as in the case of the control circuit 120 of the conventional apparatus, the control circuit 22 supplies the camera/panning head control circuit 14 with a control command corresponding to an instruction indicating zooming, panning, tilting and the like input through the mouse by the user of the terminal where the illustrated camera apparatus is installed, or transfers a camera/panning head control command from the communication partner to the camera/panning head control circuit 14. In addition, the control circuit 22 starts or stops the command determination circuit 18 in accordance with an instruction from the user.

Figure 2:
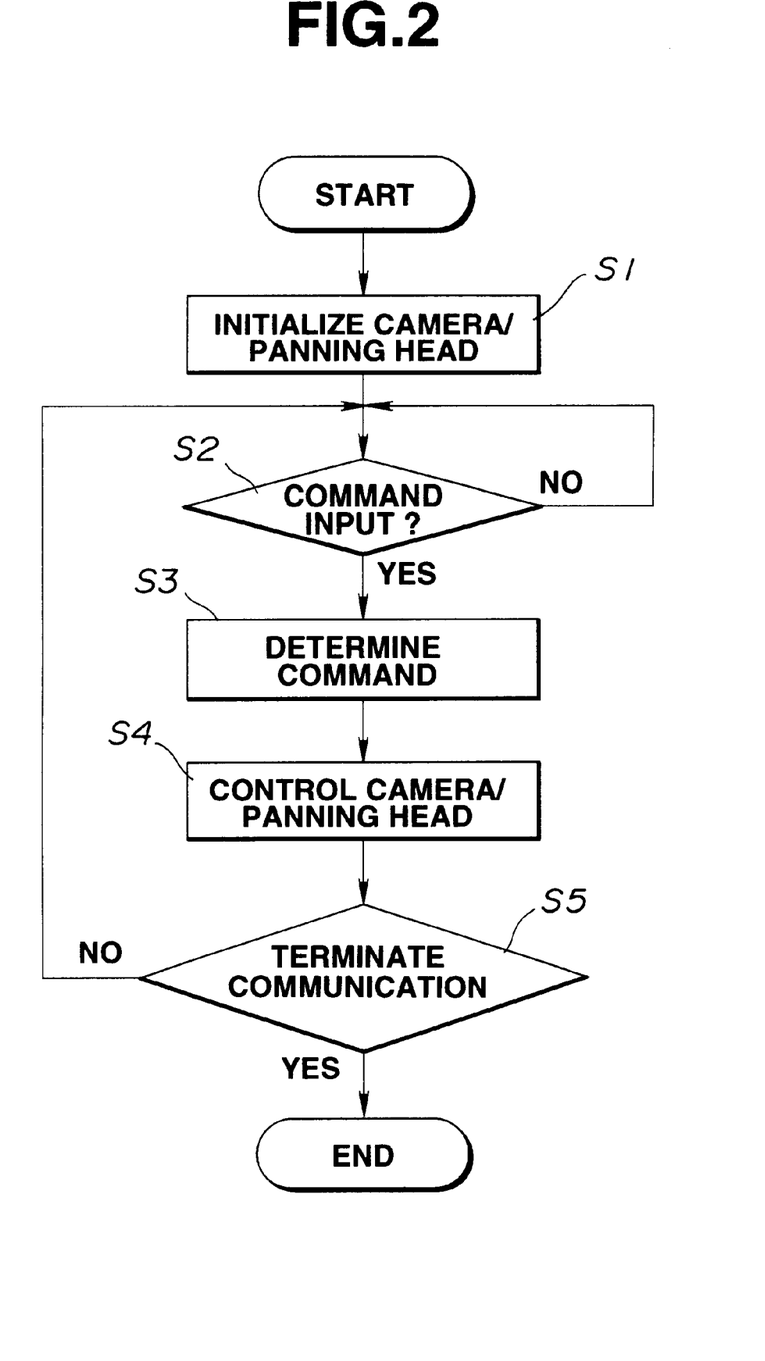
FIG. 2 is a flowchart illustrating processing for an input command in the embodiment.
Figure 3:
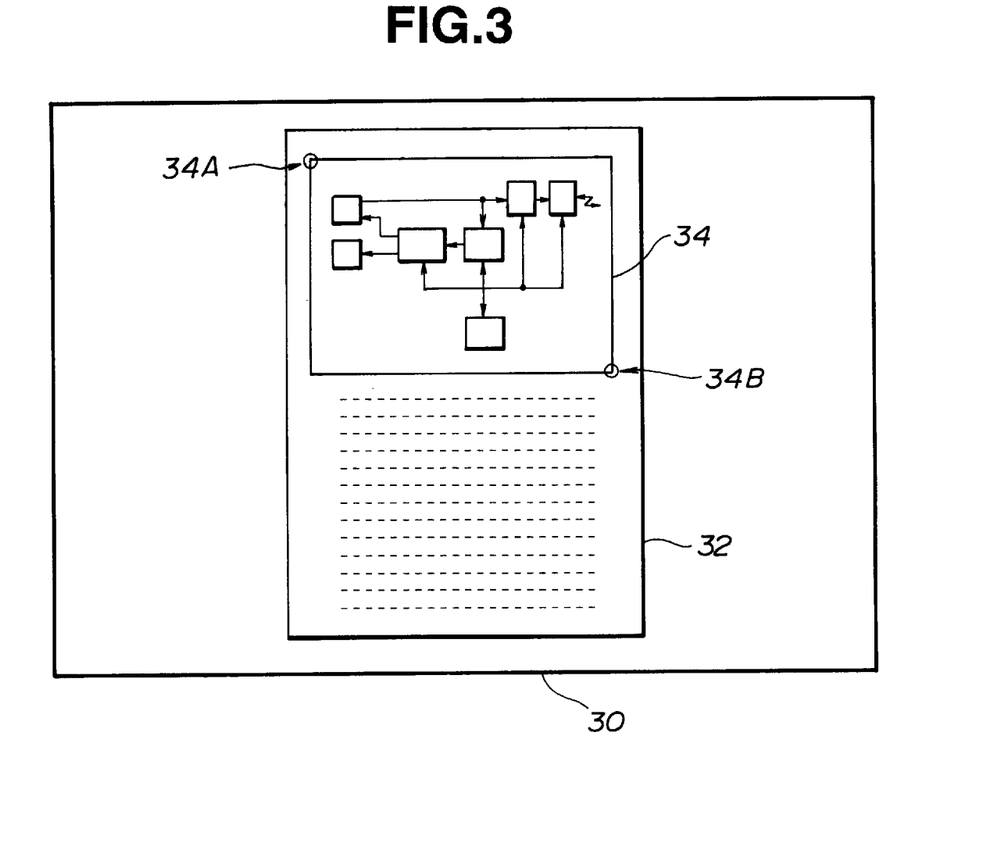
FIG. 3 is a diagram illustrating an image of a document in the embodiment.

The present embodiment will now be described in more detail with reference to FIGS. 2 and 3. FIG. 2 is a flowchart illustrating operations in the present embodiment. FIG. 3 illustrates an image photographed by the camera 10. In FIG. 3, reference numeral 30 represents the entire region photographed by the camera 10, reference numeral 32 represents a document for explanation placed in the region 30, and reference numeral 34 represents a target region for explanation to be performed. Reference numerals 34A and 34B represent apices on diagonal of the rectangle of the target region 34.

When the explainer explains the document 32, the camera 10 and the panning head 12 are initialized so that the entire document 32 can be photographed (step S1). In the initializing processing, the camera 10 is first set to the widest angle. At the same time, a menu picture for controlling the camera/panning head control circuit 14 is displayed, and a menu is selected through the input device 24 (comprising the keyboard, the mouse and the like) so as to be able to photograph the entire document 32 by controlling the camera/panning head control circuit 14.

The camera/panning head control circuit 14 awaits input of a control command to change setting from the command determination circuit 18 or the control circuit 22 (step S2).

Figure 4:
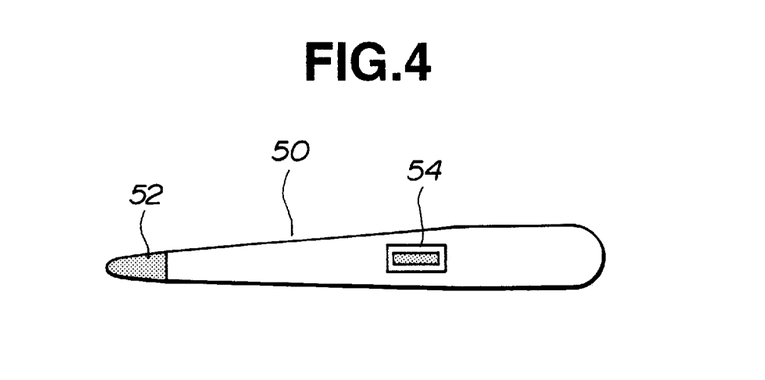
FIG. 4 is a side view of a pointing pen used in the embodiment.

In the present embodiment, a pointing pen 50 shown in FIG. 4 is used as means for inputting a camera/panning head control command from the image information picked up by the camera 10. For example, the user may use pen 50 to designate areas on the document 32 so that the camera 10 may be controlled to magnify the designated areas. The pointing pen 50 includes a light-emitting unit 54, comprising a light-emitting diode or the like, at its distal end, and an operation button 54 at a portion where a finger of a hand holding the pointing pen 50 contacts the pen. While the operation button 54 is depressed, the light-emitting unit 52 emits light. The light-emitting unit 53 may flash at a predetermined period while the operation button 54 is depressed. Alternatively, the light-emitting unit 53 may flash at different periods or emit light having different colors depending on the force to depress the operation button 54. Thus, different instructions may be easily input. The light-emitting unit 52 is omnidiretional at least in lateral directions.

A region on document 32 indicated by the pointing pen 50 can be recognized as a small region whose brightness has temporarily changed. Since the document 32 generally has no region whose brightness changes, it is possible to specify the position illuminated by the light-emitting unit 52 of the pointing pen 50 within the photographing region. For example, when the light-emitting unit 52 emits red light, the position illuminated by the light-emitting unit 52 can be determined by detecting a point where the R (red) component of photographed image data exceeds a predetermined threshold. If the value of the R component exceeds the threshold at a plurality of points, for example, the photographed image is compared with an image photographed at a time preceding the current time by a predetermined time period, and a point where the R component has changed is specified as the position illuminated by the light-emitting unit 52. It is thereby possible to perform more flexible position detection.

The locus of the light-emitting unit 52 in movement can be obtained by detecting positions of the light-emitting unit 52 at a certain time interval and connecting the detected points. In another approach, the locus can be detected by integrating the R components of photographed images in the direction of the time base.

Next, an example of a typical operation according to the present invention will be described. When intending to display an arbitrary target region 34 of the document 32 by magnifying it, the positions of the apices 34A and 34B of the target region 34 are indicated with the pointing pen 50. For example, the operation switch 54 may be switched on while individually indicating the apices 34A and 34B. In another approach, the operation switch 54 may be switched on in a state of indicating the apex 34A (or 34B), and the operation switch 54 may be switched off after moving the pointing pen 50 to the apex 34B (or 34A).

In such operations, an arbitrary region within the photographing region can be magnified with a relatively simple operation. However, in order to magnify a certain region after first magnifying another region, the target region must be set after including the entire document within the photographing field of view.

In order to return the camera 10 and the panning head 12 to an initialized state in which the entire document can be photographed as described in step S1, for example, an operation of moving (swinging, obliquely crossing or the like) the light-emitting unit 52 of the pointing pen 50 while emitting light may be determined as a camera/panning head control command to return to the initialized state. Of course, the command may be directly input to the control circuit 22 using input device 24.

Detection of an operation of the pointing pen 50, as described above, is supplied to the command determination circuit 18 together with the image of the document 32. The command determination circuit 18 traces the emission of the light-emitting unit 52 in an input image, determines the kind of instruction and parameters for assigning a range according to the pattern of the movement of the emission (step S3), generates a control command corresponding to the result of the determination (for example, a command indicating zooming-in of the target region, and the coordinate values of diagonal points of the target region), and supplies the camera/panning head control circuit 14 with the generated command (step S4). The camera/panning head control circuit 14 calculates target values for zooming, panning and tilting based on the control command from the command determination circuit 18, and controls the camera 10 and the panning head 12 to the target values.

When an instruction using the pointing pen 50 or an instruction directly input to the control circuit 22 indicates termination of communication (step S5), the communication is terminated. In other cases, the next command input is awaited (step S2).

Although a description has been provided of the method for inputting a command using the indicating pen 50 having the light-emitting unit 52, for example, a command may be input using a pointing device not having a light-emitting unit, such as a finger or a pointing bar. In such a case, the finger or the pointing bar can be recognized as an image of a specific shape having a protruded distal end extending from the border of the entire photographing region 30 or the target region 34. Accordingly, by tracing the movement of the distal end of the image of the specific shape whenever necessary, it is possible to determine various kinds of instructions as in the case of the pointing pen 50. When indicating the target region 34 using a finger, a circle incribed with the target region 34 whose region is to be assigned is assumed, and the finger is moved so as to trace the circle. The command determination circuit 18 traces the locus of the distal end of the finger, and supplies the camera/panning head control circuit 14 with a control command corresponding to the result of the determination.

When using a finger, it is difficult to identify whether the movement of the finger is for explanation or a command input. In order to solve such a problem, a movement pattern indicating that the subsequent movement of the finger represents a command input, and another movement pattern indicating that the subsequent movement of the finger does not represent a command input may be determined in advance. The finger may be moved according to the movement pattern indicating the start of a command input before performing the command input, and the finger may be moved according to the movement pattern indicating the end of the command input when intending to terminate the command input. It is apparent that a command may also be directly input to the control circuit 22.

As can be easily understood from the foregoing description, according to the present embodiment, various kinds of instructions can be input through the camera. Hence, it is possible to change the photographing state in various ways, such as exchange of documents to be photographed, indication of a specific point, and the like, and therefore to greatly improve the operability of the apparatus.

The individual components shown in outline or designated by blocks in the drawings are all well known in the image input apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image apparatus comprising:
a camera unit having an image sensor;
control means for controlling said camera unit; and
determination means for determining an instruction for said camera unit based on a change in an image picked up by said image sensor, said instruction corresponding to a positional change of a characteristic point, or locus, based on the positional change of the characteristic point picked up by said camera unit, and for outputting an instruction corresponding to a result of the determination to said control means, the output instruction including an initialization command for returning the camera unit to a predetermined initial state,
wherein the initial state is one where an entire document is picked up by the camera unit.

2. An image input apparatus according to claim 1, further comprising manually-operable indication means, operating within an imaging field of view of said camera unit, for providing information corresponding to the instruction to said camera.

3. An image input apparatus according to claim 2, wherein said indication means comprises light-emitting means for emitting or extinguishing light in accordance with a predetermined operation.

4. An image input apparatus according to claim 3, wherein said determination means determines the instruction based on a movement of said light-emitting means.

5. An image input apparatus according to claim 3, wherein said determination means determines the instruction based on the emission or the extingushment of a light of said light-emitting means.

6. An image input apparatus according to claim 1, wherein said determination means stores in advance reference data for the determination.

7. Apparatus according to claim 1, wherein said determination means determines an instruction for said camera unit based on a changed position of a light pen in the image picked up by said image sensor.

8. Apparatus according to claim 1 wherein said determination means determines an instruction for said camera unit based on a change in an image of a finger picked up by said image sensor.

9. Apparatus according to claim 1, wherein said determination means includes comparison means for comparing an image picked up by said image sensor with a previous image picked up by said image sensor, and providing said instruction based on the comparison.

10. An image apparatus comprising:
a camera unit having an image sensor;
a panning head capable of changing an imaging orientation of said camera unit;
control means for controlling at least one of said camera unit and said panning head; and
determination means for determining an instruction for at least one of said camera unit and said panning head based on a change in an image picked up by said image sensor, said instruction corresponding to a positional change of a characteristic point, or locus, based on the positional change of the characteristic point picked up by said camera unit, and for outputting an instruction corresponding to a result of the determination to said control means, the output instruction including an initialization command for returning the camera unit and/or panning head to a predetermined initial state,
wherein the initial state is one where an entire document is picked up by the camera unit.

11. An image input apparatus according to claim 10, further comprising manually-operable indication means, operating within an imaging field of view of said camera unit, for providing information corresponding to the instruction to at least one of said camera and said panning head.

12. An image input apparatus according to claim 11, wherein said indication means comprises light-emitting means for emitting or extinguishing light in accordance with a predetermined operation.

13. An image input apparatus according to claim 12, wherein said determination means determines the instruction based on a movement of said light-emitting means.

14. An image input apparatus according to claim 12, wherein said determination means determines the instruction based on the emission or the extingushment of a light of said light-emitting means.

15. An image input apparatus according to claim 10, wherein said determination means stores in advance reference data for determination.

16. Apparatus according to claim 10, wherein said determination means determines an instruction for said camera unit based on a changed position of a light pen in the image picked up by said image sensor.

17. Apparatus according to claim 10, wherein said determination means determines an instruction for said camera unit based on a change in an image of a finger picked up by said image sensor.

18. Apparatus according to claim 10, wherein said determination means includes comparison means for comparing an image picked up by said image sensor with a previous image picked up by said image sensor, and providing said instruction based on the comparison.

19. An image input method comprising the steps of:
using a camera unit having image sensor to receive an image and output a picture;
controlling the camera unit by determining an instruction for said camera unit based on a change in the image picked up by the image sensor, said instruction corresponding to a positional change of a characteristic point, or locus, based on the positional change of the characteristic point picked up by the camera unit; and
outputting an instruction corresponding to the result of the determination of the control step, the output instruction including an initialization command for returning the camera unit to a predetermined initial state, wherein the initial state is one where an entire document is picked up by the camera unit.

20. A method according to claim 19, further comprising the step of initializing the camera unit by placing the camera unit in a wide-angle mode.

21. A method according to claim 19, further comprising the step of returning the camera unit to an initialized condition by determining a predetermined characteristic, or locus, in the picture output from the camera unit.

22. A method according to claim 19 wherein the step of controlling the camera unit includes the step of determining an instruction for the camera unit based on a change in a light pen in the image picked up by the image sensor.

23. A method according to claim 19, wherein the controlling step determines the instruction for said camera unit based on a change in an image of a finger picked up by said image sensor.

24. A method according to claim 19, wherein the control step includes the step of comparing an image picked up by the image sensor with a previous image picked up by the image sensor, and providing said instruction based on the comparison.

25. A method of inputting an image comprising the steps of:

using a camera unit having an image sensor to receive an image and output a picture;

using a panning head unit for changing an imaging orientation of the camera unit;

a control step for controlling at least one of the camera unit and the panning head by determining an instruction for at least one of the camera unit and panning head based on a change in the image picked up by the image sensor, said instruction corresponding to a positional change of a characteristic point, or locus, based on the positional change of the characteristic point picked up by the camera unit; and outputting an instruction corresponding to the result of the determination of said control step, the output instruction including an initialization command for returning the camera unit and/or panning head unit to a predetermined initial state, wherein the initial state is one where an entire document is picked up by the camera unit.

26. A method according to claim 25, further comprising the step of initializing the camera unit by placing the camera unit in a wide-angle mode.

27. A method according to claim 25, further comprising the step of returning the camera unit to an initialized condition by determining a predetermined characteristic, or locus, in the picture output from the camera unit.

28. A method according to claim 25 wherein the step of controlling the camera unit includes the step of determining an instruction for the camera unit based on a change in a light pen in the image picked up by the image sensor.

29. A method according to claim 25, wherein the controlling step determines the instruction for said camera unit based on a change in an image of a finger picked up by said image sensor.

30. A method according to claim 25, wherein the control step includes the step of comparing an image picked up by the image sensor with a previous image picked up by the image sensor, and providing said instruction based on the comparison.

31. An image input system for picking up an object comprising:

a camera unit having an image sensor;

control means for controlling said camera unit;

generation means for generating a characteristic point or locus at a desired position on the object; and determination means for determining an instruction for said camera unit based on a change in an image picked up by said image sensor, said instruction corresponding to a positional change of the characteristic point or locus on the object, based on the positional change of the characteristic point or locus on the object picked up by said image sensor, and for outputting an instruction corresponding to a result of the determination to said control means.

32. The system according to claim 31, wherein the object is in a stationary state.

33. An image input method ofr picking up an object comprising the steps of:

using a camera unit having an image sensor to receive an image and output a picture;

generating a characteristic point or locus on the object at a desired position on the object;

controlling the camera unit by determining an instruction for said camera unit based on a change in the image picked up by the image sensor, said instruction corresponding to a positional change of the characteristic point or locus on the object, based on the positional change of the characteristic point or locus on the object picked up by said image sensor; and outputting an instruction corresponding to a result of the determination of the control step.

34. The method according to claim 33, wherein the object is in a stationary state.

* * * * *

UNITED STATES PATENT AND TRADEMARK OFFICE
CERTIFICATE OF CORRECTION

PATENT NO. : 6,239,835 B1
DATED : May 29, 2001
INVENTOR(S) : Shinjiro Hori

It is certified that error appears in the above-identified patent and that said Letters Patent is hereby corrected as shown below:

Column 7,
Line 26, "An image apparatus" should read -- An image input apparatus --;
Line 30, "based on a change in an image picked" should be deleted;
Lines 31 and 32 should be deleted;
Line 33, "the" (first occurrence) should read -- a --;
Line 60, "Apparatus" should read -- An image input apparatus --;
Line 64, "Apparatus" should read -- An image input apparatus --; and
Line 64, "claim 1" should read -- claim 1, --.

Column 8,
Line 1, "Apparatus" should read -- An image input apparatus --;
Line 6, "An image apparatus" should read -- An image input apparatus --;
Line 13, "change in an image picked up by said image" should be deleted;
Lines 14 and 15 should be deleted;
Line 43, "Apparatus" should read -- An image input apparatus --;
Line 47, "Apparatus" should read -- An image input apparatus --;
Line 51, "Apparatus" should read -- An image input apparatus --;
Line 60, "change in the image" should be deleted;
Lines 61 and 62 should be deleted; and
Line 63, "point, or locus, based on the" should be deleted.

Column 9,
Line 12, "claim 19" should read -- claim 19, --;
Line 34, "change in the image picked up by the image" should be deleted; and
Lines 35 and 36 should be deleted.

UNITED STATES PATENT AND TRADEMARK OFFICE
CERTIFICATE OF CORRECTION

PATENT NO. : 6,239,835 B1
DATED : May 29, 2001
INVENTOR(S) : Shinjiro Hori

It is certified that error appears in the above-identified patent and that said Letters Patent is hereby corrected as shown below:

<u>Column 10,</u>
Line 3, "claim 25" should read -- claim 25, --;
Line 22, "change in an image picked" should be deleted;
Lines 23 and 24 should be deleted;
Line 25, "locus on the object, based on the" should be deleted;
Line 32, "ofr" should read -- for --;
Line 40, "change in the image" should be deleted;
Lines 41 and 42 should be deleted; and
Line 43, "point or locus on the object, based on the" should be deleted.

Signed and Sealed this

Eighteenth Day of June, 2002

Attest:

JAMES E. ROGAN
*Attesting Officer*     *Director of the United States Patent and Trademark Office*